US012594776B2

(12) United States Patent
Murata

(10) Patent No.: US 12,594,776 B2
(45) Date of Patent: Apr. 7, 2026

(54) ROLLED PAPER PRINTING DEVICE

(71) Applicant: SEIKO EPSON CORPORATION, Tokyo (JP)

(72) Inventor: Shoichi Murata, Yamagata-Mura (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 18/432,253

(22) Filed: Feb. 5, 2024

(65) Prior Publication Data

US 2024/0262113 A1 Aug. 8, 2024

(30) Foreign Application Priority Data

Feb. 6, 2023 (JP) ................................ 2023-015927

(51) Int. Cl.

| | |
|---|---|
| ***B41J 15/04*** | (2006.01) |
| ***B41J 2/32*** | (2006.01) |
| ***B41J 3/407*** | (2006.01) |
| ***B41J 11/04*** | (2006.01) |
| ***B41J 11/70*** | (2006.01) |
| ***B41J 15/02*** | (2006.01) |
| ***B41J 29/13*** | (2006.01) |

(52) U.S. Cl.

CPC ............... *B41J 15/046* (2013.01); *B41J 2/32* (2013.01); *B41J 3/4075* (2013.01); *B41J 11/04* (2013.01); *B41J 11/70* (2013.01); *B41J 15/02* (2013.01); *B41J 15/042* (2013.01); *B41J 29/13* (2013.01)

(58) Field of Classification Search

CPC . B41J 15/046; B41J 2/32; B41J 3/4075; B41J 11/04; B41J 11/70; B41J 15/02; B41J 15/042; B41J 29/13; B41J 15/04

USPC .......................................................... 347/218

See application file for complete search history.

(56) References Cited

U.S. PATENT DOCUMENTS

2004/0234316 A1* 11/2004 Matsuse ................ B41J 15/042
400/613

FOREIGN PATENT DOCUMENTS

JP 2008-068950 A 3/2008

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A rolled paper printing device includes a cover that opens/closes a case, a roller that draws out paper from rolled paper, a head for printing, a cutter that cuts the paper, and a paper guide mounted on the cover. When the cover is closed, a paper discharge port for discharging the paper is formed, and the paper guide includes a first guide that guides a first surface of the paper, a second guide that guides a second surface of the paper, a first opening into which the paper discharged from the paper discharge port is inserted, a second opening communicating with the first opening, the paper being taken out from the second opening, and a projection formed at the first guide and configured to come into contact with the first surface of the paper at a position downstream of the second opening in a transport direction.

6 Claims, 7 Drawing Sheets

ROLLED PAPER PRINTING DEVICE

The present application is based on, and claims priority from JP Application Serial Number 2023-015927, filed Feb. 6, 2023, the disclosure of which is hereby incorporated by reference herein in its entirety.

BACKGROUND

1. Technical Field

The present disclosure relates to a rolled paper printing device.

2. Related Art

In related art, as disclosed in JP-A-2008-68950, a printer that performs printing by using rolled paper and includes a cutting blade which cuts paper and a paper discharge guide which is installed in a paper discharge port has been known.

In the above-described printer, there is a concern that the paper may fall from the paper discharge guide.

SUMMARY

According to an aspect of the present disclosure, a rolled paper printing device includes a cover that opens/closes a case, a roller that draws out paper from rolled paper stored in the case, and transports the paper in a transport direction, a head that performs printing on the paper at a position facing the roller, a cutter that cuts the paper at a position downstream of the head in the transport direction and a paper guide mounted on the cover. When the cover is closed, a paper discharge port for discharging the paper is formed between the cover and the case, and the paper guide includes a first guide that guides a first surface of the paper, a second guide that guides a second surface of the paper, a first opening into which the paper discharged from the paper discharge port is inserted, a second opening communicating with the first opening, the paper being taken out from the second opening, and a projection formed at the first guide and configured to come into contact with the first surface of the paper at a position downstream of the second opening in the transport direction.

DESCRIPTION OF EMBODIMENTS

1. Embodiment

Figure 1:
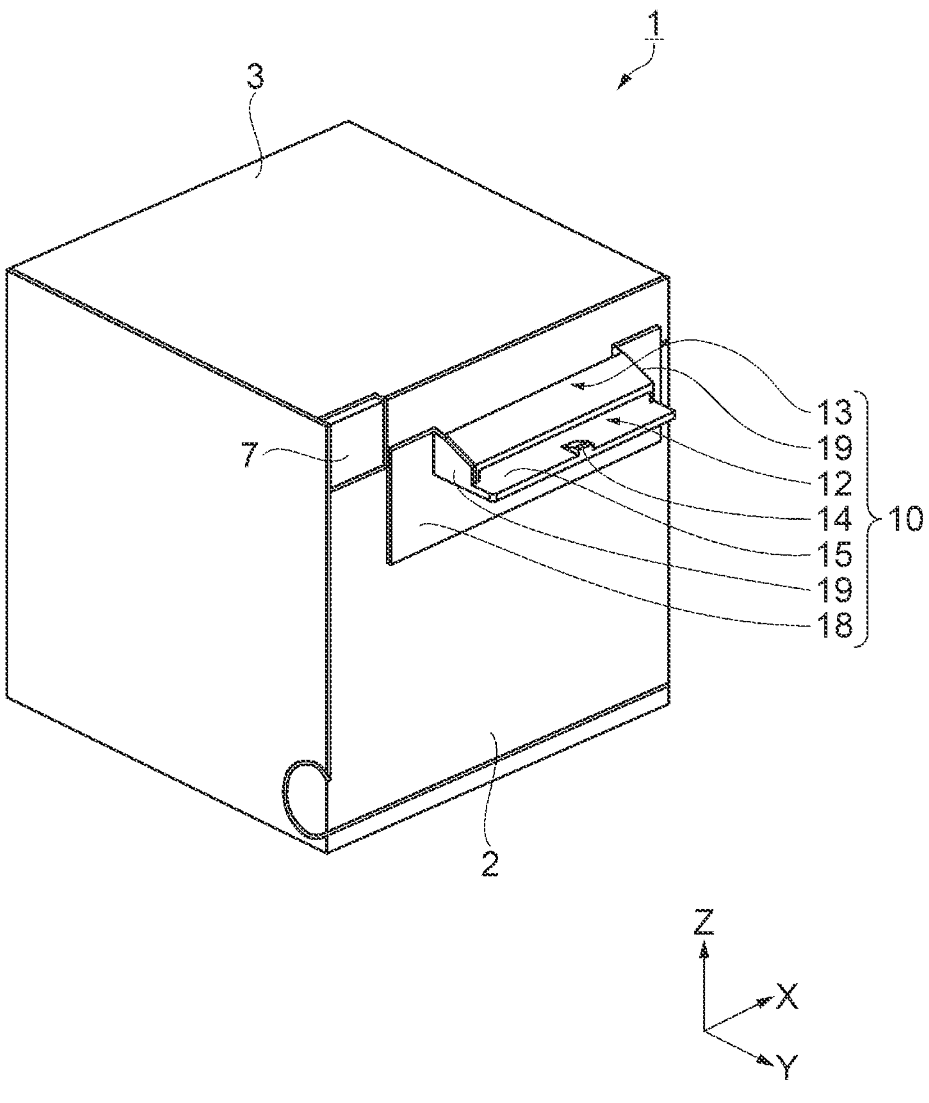
FIG. 1 is a perspective view of a rolled paper printing device.

1-1. Configuration of Rolled Paper Printing Device

Hereinafter, a configuration of a rolled paper printing device according to an embodiment will be described with reference to FIGS. 1 to 7. Note that, directions in the drawings will be described by using a three-dimensional coordinate system. For the sake of convenience in description, a positive direction of a Z-axis is referred to as an upper direction, an upper side, or simply upper, a negative direction is referred to as a lower direction, a lower side, or simply lower, a positive direction of an X-axis is referred to as a right direction, a right side, or simply right, a negative direction is referred to as a left direction, a left side, or simply left, a positive direction of a Y-axis is referred to as a front direction, a front side, or simply front, and a negative direction is referred to as a rear direction, a rear side, or simply rear.

A rolled paper printing device 1 shown in FIG. 1 is used for printing in, for example, a point of sale (POS) system. Note that, hereinafter, the rolled paper printing device 1 is simply referred to as a printing device 1.

The printing device 1 includes a case 3 capable of storing rolled paper R to be described later and a cover 2 capable of opening/closing the case 3. The cover 2 can be locked to the case 3 by a lock mechanism 7.

A paper guide 10 for guiding paper P1 to be described later is mounted on the cover 2. The paper guide 10 has a first opening 11 to be described later, into which the paper P1 is inserted from the rear side, a second opening 12 from which the paper P1 is taken out to the front side, and a third opening 13 from which the paper P1 can be taken out to the upper side when the paper P1 cannot be taken out from the second opening 12.

Further, the paper guide 10 includes a second guide 16 and a first guide 15, which will be described later, capable of guiding the paper P1 from the upper side and the lower side, respectively, side plates 19 capable of guiding the paper P1 from the left and the right, a projection 14 formed at the front side of the first guide 15 and at a center in the left-right direction, and an attachment plate 18 for attaching the paper guide 10 to the cover 2.

Note that, the attachment plate 18 may be integrally molded with the cover 2 by using a resin or the like, or may be fixed to the cover 2 by using a double-sided tape, an adhesive, or the like. Alternatively, the attachment plate 18 may be detachably attached to the cover 2 with a screw or the like.

Figure 2:
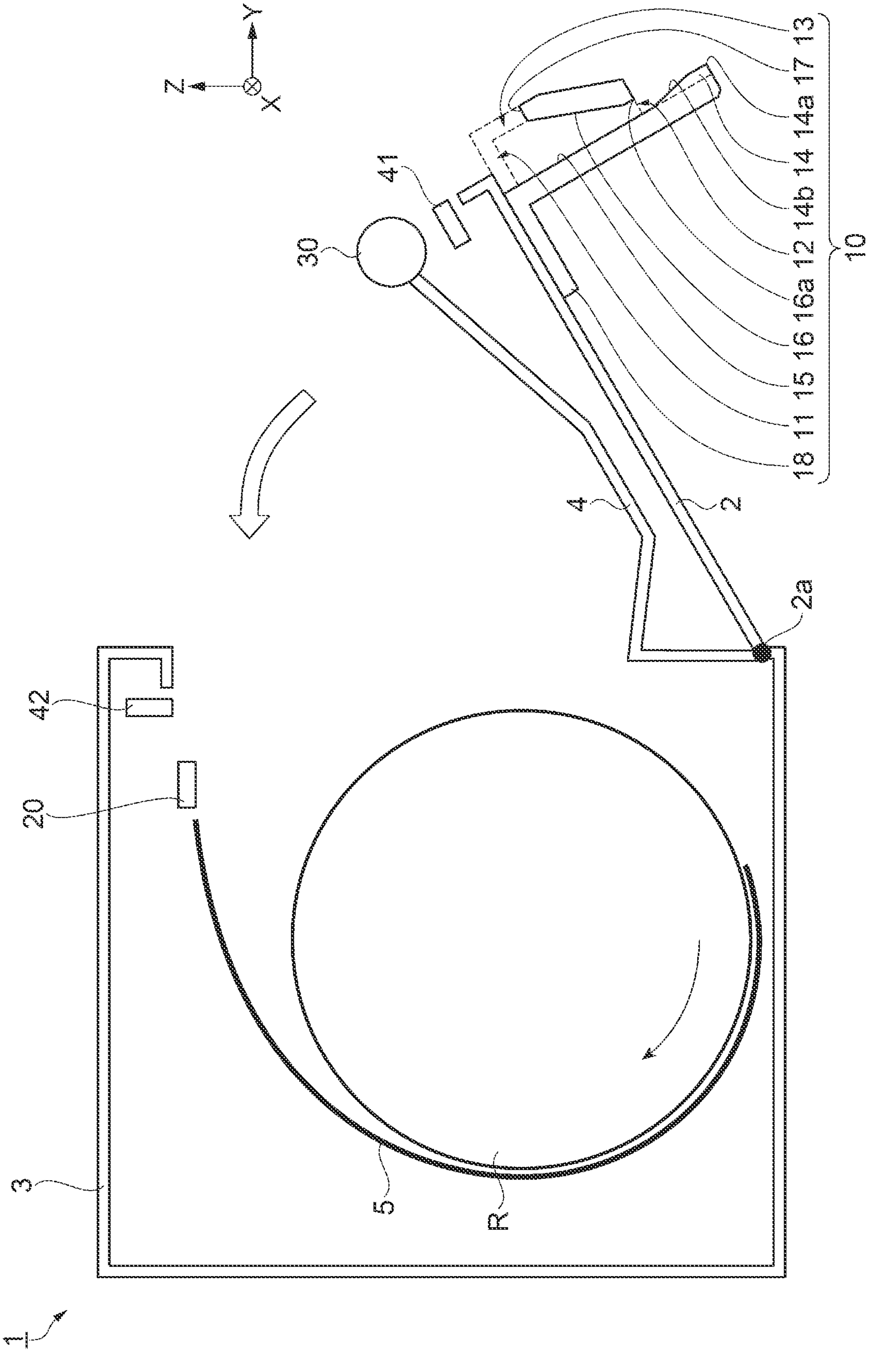
FIG. 2 is a cross-sectional view showing a configuration of the rolled paper printing device when a cover is opened.

As shown in FIG. 2, the cover 2 is rotatable around a hinge 2*a* of the case 3. A user can open the cover 2 and can store the rolled paper R in the case 3.

In addition to the paper guide 10, a roller 30, a first blade 41 constituting a cutter 40 to be described later, and a first rolled paper guide 4 are mounted on the cover 2.

Meanwhile, a head 20, a second blade 42 constituting the cutter 40, and a second rolled paper guide 5 are mounted on the case 3.

Figure 3:
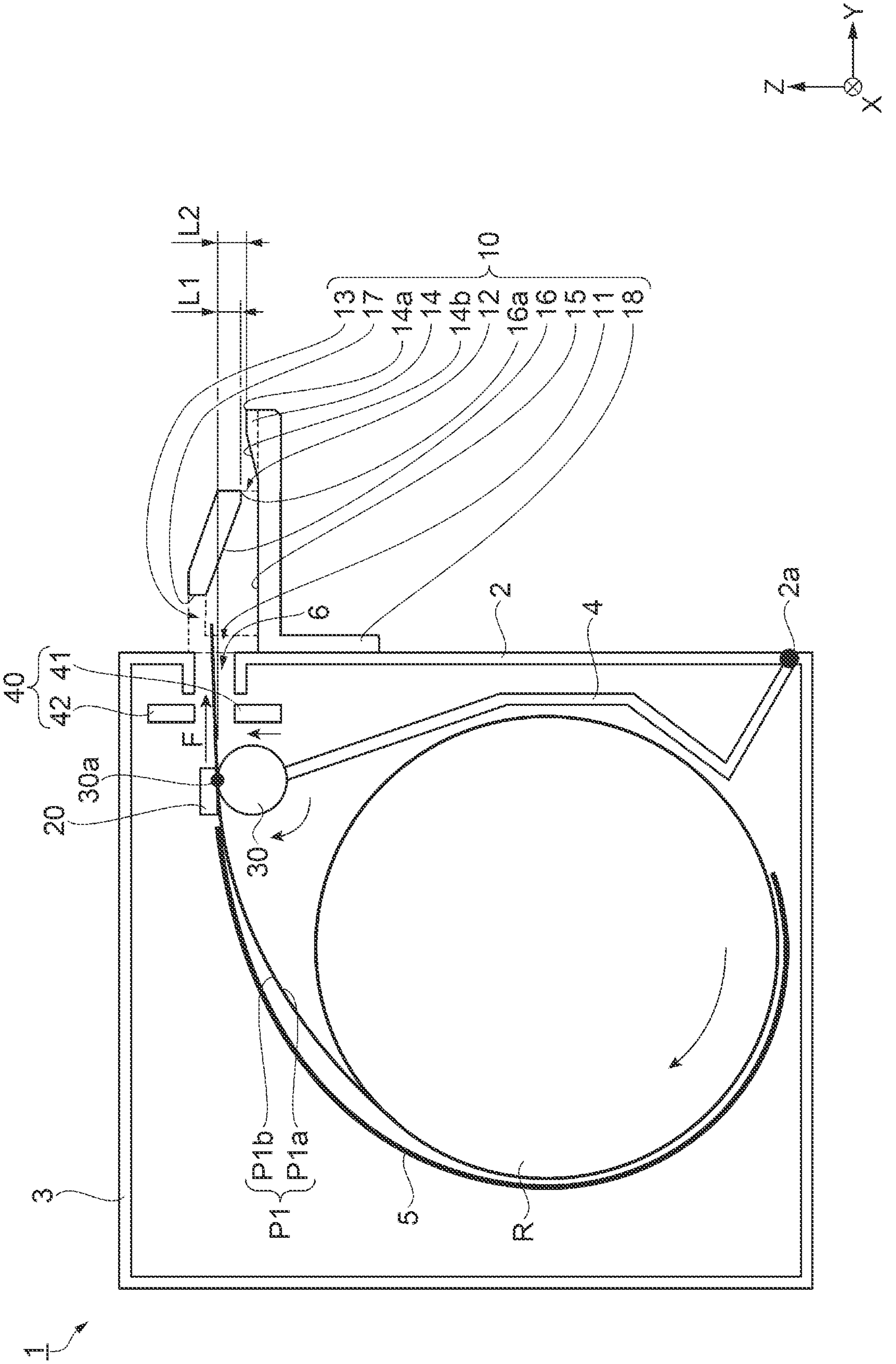
FIG. 3 is a cross-sectional view showing a configuration of the rolled paper printing device when the cover is closed.

As shown in FIG. 3, when the cover 2 is closed, the roller 30 and the head 20 are positioned to face each other, and the first blade 41 and the second blade 42 of the cutter 40 are positioned to face each other. The cutter 40 is positioned downstream of the roller 30 and the head 20 in a transport direction F to be described later.

When the cover 2 is closed, a paper discharge port 6 is formed between the cover 2 and the case 3. The rolled paper R is rotatably supported by the first rolled paper guide 4 of the cover 2 and the second rolled paper guide 5 of the case 3.

The roller 30 is formed in a cylindrical shape by using a material such as a flexible resin such as rubber. The roller 30 is positioned to face the head 20 via the paper P1, and is also referred to as a platen.

The roller 30 and the head 20 nip the paper P1 at a nip position 30*a*. The roller 30 transports the paper P1 by a friction feed method, which is a method for transporting the paper by friction. The roller 30 rotates clockwise, draws out the paper P1 from the rolled paper R, and transports the paper in the transport direction F. At this time, the rolled paper R also rotates clockwise.

The head 20 is, for example, a line thermal head. The head 20 includes a pressing mechanism, which is not shown, that presses the paper toward the roller 30. At the nip position 30*a*, the paper P1 is nipped by the roller 30 and the head 20 with a predetermined pressure by the pressing mechanism.

The paper P1 is, for example, a long heat-sensitive paper. A first surface P1*a* of the paper P1 is a transported surface transported by the roller 30. A second surface P1*b* of the paper P1 is a printed surface to which a coloring agent is applied.

Printing is performed for the paper P1 while the first surface P1*a* comes into contact with the roller 30 to be transported and the second surface P1*b* comes into contact with the head 20 to be colored by heat generated by the head 20. Note that, the paper P1 is wound around the rolled paper R such that an outer side becomes the printed surface.

The paper P1 transported in the transport direction F by the roller 30 and discharged from the paper discharge port 6 enters the first opening 11, which is an inlet of the paper guide 10. Of the paper P1 entering the first opening 11, the first surface P1*a* is guided from the lower side by the first guide 15, and the second surface P1*b* is guided from the upper side by the second guide 16.

The lower side of the first opening 11 of the paper guide 10 is defined by the first guide 15. The front upper side of the first opening 11 communicates with the third opening 13. The front side of the third opening 13 is defined by a third guide 17, and the rear side of the third opening 13 is defined by the case 3.

The second opening 12 which is an outlet of the paper guide 10 of the paper P1 communicates with the front direction which is the transport direction F of the first opening 11. The paper P1 is transported in the transport direction F by the roller 30, enters from the first opening 11 of the paper guide 10, and is taken out from the second opening 12.

The upper-lower direction of the second opening 12 is defined by an end portion 16*a* of the second guide 16 and the first guide 15. The left-right directions of the first opening 11 and the second opening 12 are defined by the side plates 19.

The first guide 15 is formed as a planar surface in the front-rear and left-right directions. The second guide 16 is formed as an inclined surface inclined to the lower side toward the front direction. Thus, the first guide 15 and the second guide 16 can smoothly guide the paper P1 from the first opening 11 toward the second opening 12. The upper side of the space in the paper guide 10 through which the paper P1 passes is gradually narrowed from the first opening 11 toward the second opening 12.

Note that, the first guide 15 is at a position on the front lower side with respect to a position of an edge of the cover 2 forming the paper discharge port 6. On the first guide 15, the paper P1 discharged from the paper discharge port 6 can be smoothly mounted.

The projection 14 is formed at the first guide 15 at a position on the front side which is downstream of the second opening 12 in the transport direction F. The projection 14 can come into contact with the paper P1, and has a distal end 14*a* and an inclined surface 14*b*.

With a height of the nip position 30*a* as a reference, the end portion 16*a* of the second guide 16 is positioned at a first distance L1 on the lower side, and the distal end 14*a* of the projection 14 is positioned at a second distance L2 on the lower side. The first distance L1 is smaller than the second distance L2, and L1<L2.

That is, the end portion 16*a* of the second guide 16 is at a position lower than the height of the nip position 30*a* by the first distance L1, and the distal end 14*a* of the projection 14 is at a position lower than the height of the nip position by the second distance L2. Then, the distal end 14*a* of the projection 14 is at a position lower than the end portion 16*a* of the second guide 16.

Figure 4:
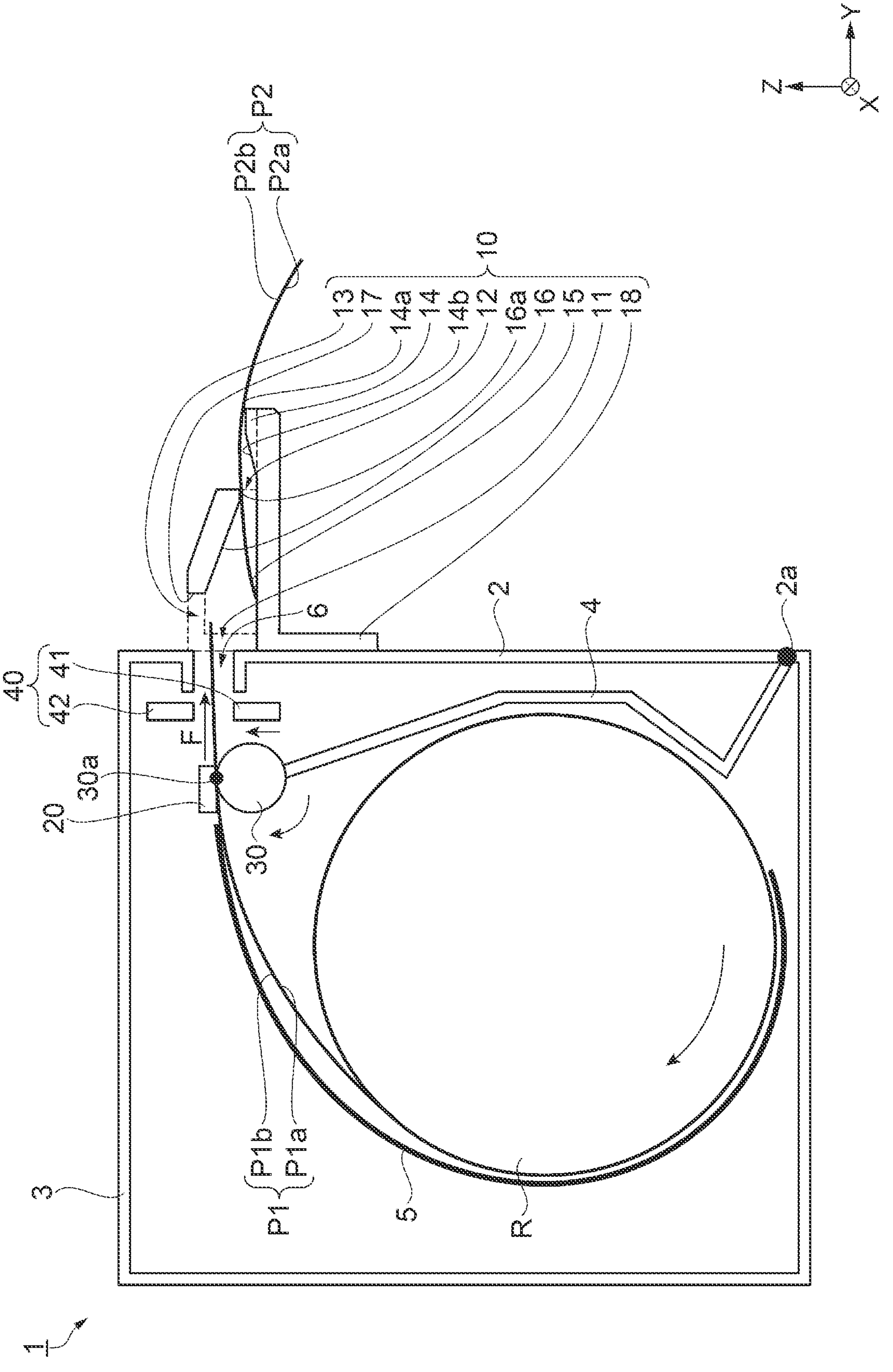
FIG. 4 is a cross-sectional view showing a configuration of the rolled paper printing device when a paper piece is supported by a paper guide.

As shown in FIG. 4, the paper P1 is discharged from the paper discharge port 6 while being transported in the transport direction F by the roller 30. Further, the paper P1 is transported in the transport direction F while being guided by the paper guide 10, and is taken out from a front end to an outside of the paper guide 10. Note that, as will be described later, thereafter, a paper piece P2 is the paper P1 cut by the cutter 40.

The inclined surface 14*b* of the projection 14 is inclined to the front upper side. Of the paper P1 taken out from the second opening 12 of the paper guide 10, after the second surface P1*b* comes into contact with the end portion 16*a* of the second guide 16, the first surface P1*a* is directed to the front upper side along the inclined surface 14*b* of the projection 14 and comes into contact with the distal end 14*a*.

Since the distal end 14*a* of the projection 14 is at the position lower than the end portion 16*a* of the second guide 16, the front end of the paper P1 can smoothly advance along the inclined surface 14*b* without being caught by the projection 14.

Figure 5:
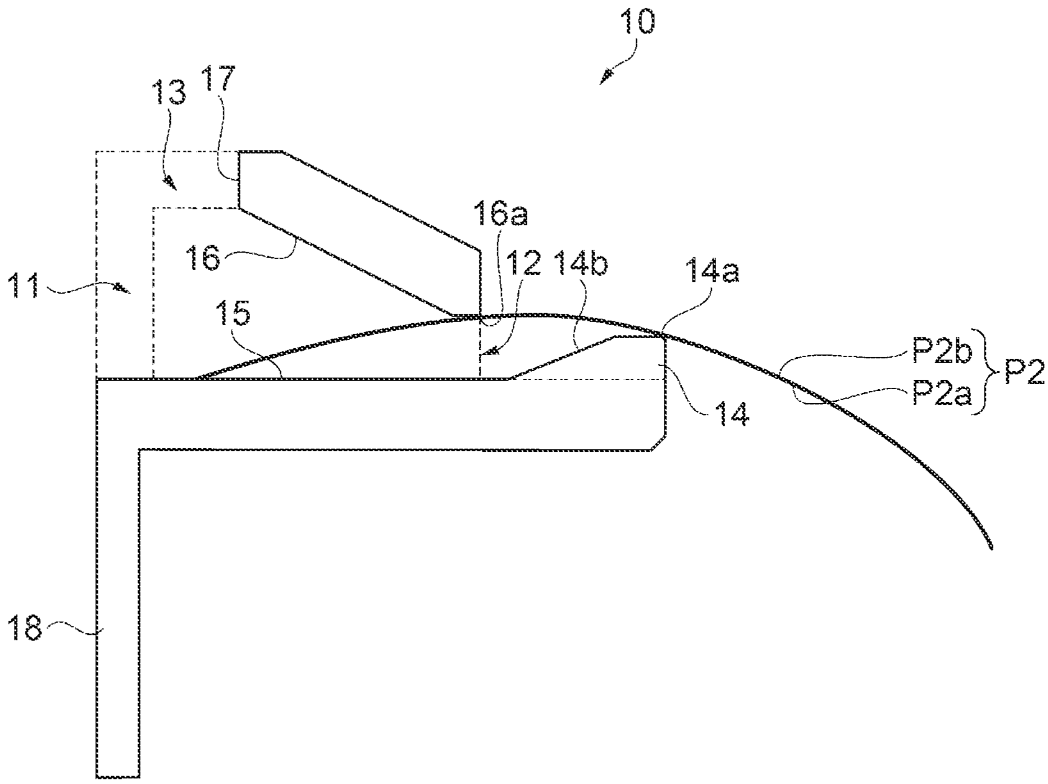
FIG. 5 is a cross-sectional view showing a configuration with the paper guide as a center in FIG. 4.

The paper P1 transported by the roller 30 by a predetermined distance is cut by the cutter 40. In the cutter 40, the first blade 41 crosses the second blade 42 while moving toward the second blade 42, and cuts the paper P1 between the first blade 41 and the second blade 42. FIGS. 4 and 5 show the cut paper P1 as the paper piece P2.

The cutter 40 can perform so-called full cutting in which the paper P1 is cut over the entire width such that there is no uncut portion. Since the paper piece P2 which is the fully cut paper P1 is cut off from the rolled paper R, the user can easily take out the paper piece P2 from the paper guide 10.

As shown in FIGS. 4 and 5, similarly to the paper P1, a paper piece first surface P2*a* of the paper piece P2 is a transported surface, and a paper piece second surface P2*b* is a printed surface. Then, at least the paper piece second surface P2*b* of the paper piece P2 comes into contact with the end portion 16*a* of the second guide 16, and the paper piece first surface P2*a* comes into contact with the distal end 14*a* of the projection 14.

That is, the paper piece P2 is supported by at least the end portion 16*a* of the second guide 16 and the distal end 14*a* of the projection 14 in the paper guide 10.

Further, as a curl of the paper P1 to be described later becomes stronger, a rear end of the paper piece P2 comes into contact with the first guide 15. At this time, the paper piece P2 is also supported by the first guide 15. In addition, when next paper P1 is transported in the transport direction F by the roller 30, the rear end of the paper piece P2 of the paper discharge port 6 may be pressed by the next paper P1 and may be at a position to be supported by the first guide 15.

When the curl is weak immediately after cutting, the rear end of the paper piece P2 may be mounted and supported on the paper discharge port 6.

Incidentally, since the paper P1 is wound around the rolled paper R in a roll shape, the paper is curled. The closer the paper P1 is wound to a center of the rolled paper R, the stronger the curl becomes. In addition, the thicker the paper P1, the stronger the curl.

As shown in FIGS. 4 and 5, since the paper piece P2 which is the cut paper P1 is also curled to the lower side, the paper piece tends to be curled to the lower side. That is, due to the curl, the front and rear ends of the paper piece P2 tend to be directed to the lower side, and a center in the front-rear direction tends to move to the upper side. As described above, due to the curl, the paper piece P2 has an elastic force like a plate spring curved to the lower side.

The end portion 16*a* of the second guide 16 comes into contact with the paper piece second surface P2*b* of the paper piece P2 from the upper side. A portion where the paper piece P2 comes into contact with the end portion 16*a* is also a portion that tends to be directed to the upper side due to the curl.

Meanwhile, the distal end 14*a* of the projection 14 comes into contact with the paper piece first surface P2*a* of the paper piece P2 from the lower side at a position on the front side with respect to the end portion 16*a*. Further, the first guide 15 can come into contact with the paper piece first surface P2*a* of the paper piece P2 from the lower side at a position on the rear side with respect to the end portion 16*a*. Portions where the paper piece P2 comes into contact with the distal end 14*a* of the projection 14 and the first guide 15 are also portions that tend to be directed to the lower side due to the curl.

That is, the end portion 16*a* of the second guide 16 can press the paper piece P2 to the lower side against the elastic force of the curl that tends to be directed to the upper side. Further, the distal end 14*a* of the projection 14 and the first guide 15 can press the paper piece P2 to the upper side against the elastic force of the curl that tends to be directed to the lower side.

Based on the elastic force of the curl of the paper piece P2, the end portion 16*a* of the second guide 16, the distal end 14*a* of the projection 14, and the first guide 15 can generate larger frictional forces at the portions where the end portion 16*a*, the distal end 14*a*, and the first guide 15 come into contact with the paper piece P2. The stronger the curl of the paper piece P2, the larger these frictional forces.

As a result, it is possible to suppress falling of the paper piece P2 from the paper guide 10 due to at least the frictional forces generated between the end portion 16*a* of the second guide 16 and the distal end 14*a* of the projection 14, and the paper piece P2.

In addition to these frictional forces, when the first guide 15 comes into contact with the paper piece P2, it is possible to further suppress the falling of the paper piece P2 from the paper guide 10 by the frictional forces generated between the first guide 15 and the paper piece P2.

In other words, the end portion 16*a* of the second guide 16, the distal end 14*a* of the projection 14, and the first guide 15 are disposed to bend the paper piece P2 against the curl of the paper piece P2. That is, the end portion 16*a*, the distal end 14*a*, and the first guide 15 can act to correct the curl of the paper piece P2.

As a result, the end portion 16*a* of the second guide 16, the distal end 14*a* of the projection 14, and the first guide 15 can more strongly receive the elastic force of the curl of the paper piece P2, and can more strongly come into contact with the paper piece P2. Further, the larger frictional forces can be generated between the end portion 16*a*, the distal end 14*a*, and the first guide 15, and the paper piece P2, and it is possible to suppress the falling of the paper piece P2 from the paper guide 10.

As described above, at least the end portion 16*a* of the second guide 16 and the distal end 14*a* of the projection 14 support the paper piece P2, and the first guide 15 can also support the paper piece P2.

Based on the curl of the paper piece P2, the larger frictional forces can be generated between at least the end portion 16*a* of the second guide 16 and the distal end 14*a* of the projection 14, and the paper piece P2, and the larger frictional force can also be generated between the first guide 15 and the paper piece P2.

As a result, even when the front end of the paper piece P2 passes over the distal end 14*a* of the projection 14 and hangs to the lower side, the paper guide 10 can suppress the falling of the paper piece P2.

The user can easily take out the paper piece P2 mounted on the paper guide 10 without picking up the paper piece P2 fallen and scattered from the paper guide 10.

Incidentally, as shown in FIGS. 4 and 5, due to the curl of the paper piece P2, the paper piece P2 on the read side with respect to the position of the end portion 16*a* of the second guide 16 is directed to the lower side. That is, in the paper guide 10 in which the paper piece P2 remains, a wider space is formed on the upper side of the paper piece P2 toward the first opening 11 from the second opening 12.

It is assumed that next paper P1 is drawn out from the rolled paper R by the roller 30 and is transported in the transport direction F. The next paper P1 discharged from the paper discharge port 6 enters the first opening 11 of the paper guide 10. At this time, a space in the paper guide 10 close to the first opening 11 is formed as the wide space on the upper side of the paper piece P2. Thus, the next paper P1 can smoothly pass through the first opening 11 without being obstructed by the paper piece P2 remaining in the paper guide 10.

Further, the next paper P1 can be smoothly transported while being guided by the first guide 15 and the second guide 16, and can be taken out from the second opening 12.

At this time, since the rear end of the paper piece P2 is directed to the lower side due to the curl, the next paper P1 to be transported can smoothly ride on the paper piece P2. Then, the next paper P1 can be smoothly transported while coming into contact with the end portion 16*a* of the second guide 16 on the upper side and the paper piece P2 on the lower side.

As described above, even when the user does not take out the paper piece P2 mounted on the paper guide 10, the paper guide 10 can smoothly transport the next paper P1 without causing a paper jam or the like.

As described above, after the second surface P1*b* of the paper P1 taken out from the second opening 12 of the paper guide 10 comes into contact with the end portion 16*a* of the second guide 16, the first surface P1*a* is directed to the front upper side along the inclined surface 14*b* of the projection 14 and comes into contact with the distal end 14*a*. Then, the paper P1 is cut by the cutter 40 to become the paper piece P2.

Figure 6:
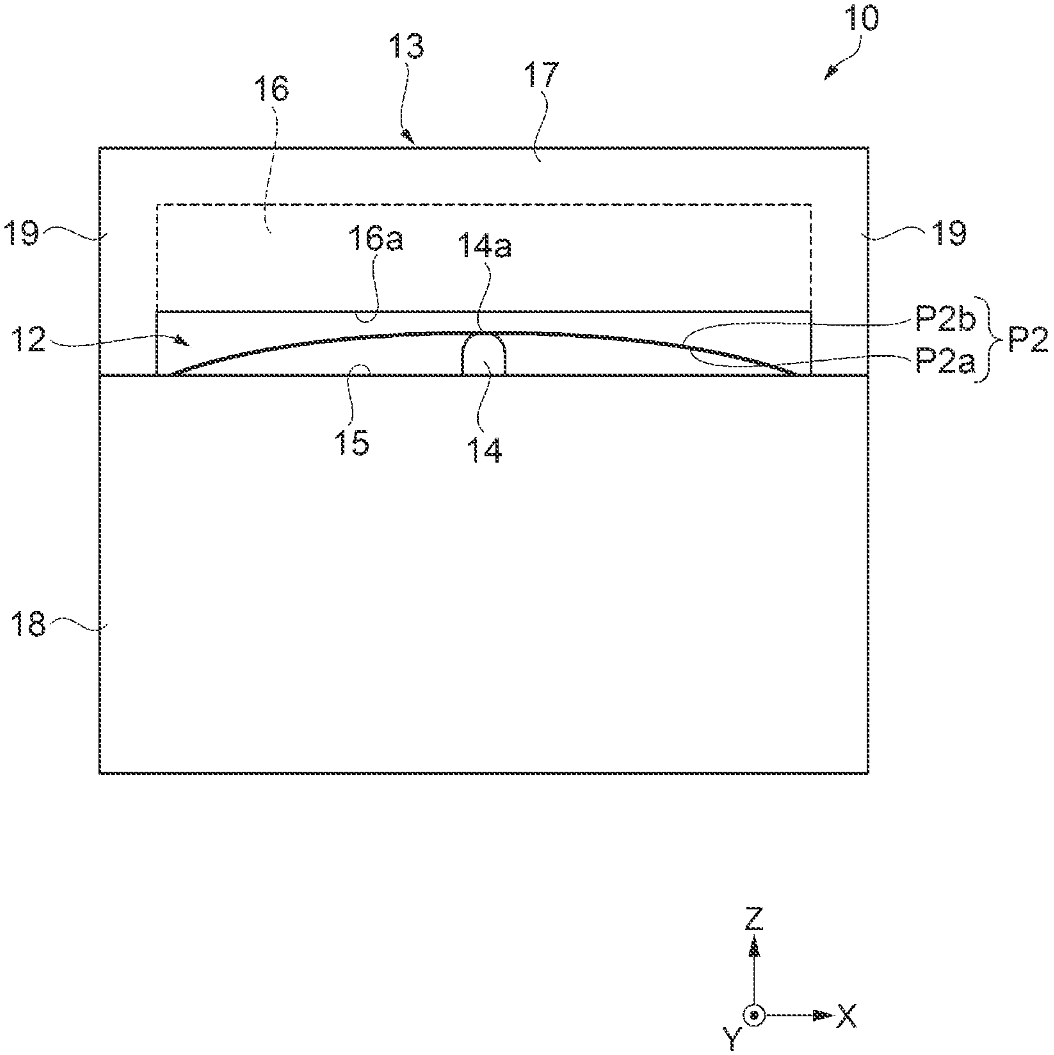
FIG. 6 is a front view showing a curvature of the paper with the paper guide as the center in FIG. 4.

FIG. 6 shows a cross section of the paper piece P2 at the position of the distal end 14*a* of the projection 14. The paper piece P2 comes into contact with the distal end 14*a* of the projection 14 in the vicinity of a center in the left-right direction which is a width direction, and rises to the upper side. Meanwhile, since portions other than the vicinity of the center of the paper piece P2 do not come into contact with the projection 14, the paper piece is directed to the lower side toward both ends in the left-right direction. The paper piece P2 has a shape curved in the left-right direction.

When the paper P1 is transported in the transport direction F by the roller 30, the paper P1 comes into contact with the end portion 16*a* of the second guide 16, rides on the inclined surface 14*b* of the projection 14, and comes into contact with the distal end 14*a* to be curved. Thereafter, the paper P1 is cut by the cutter 40, and is shown as the paper piece P2 in FIG. 6.

As described above, the paper piece P2 is curved in the left-right direction with the position where the paper piece P2 comes into contact with the projection 14. The paper piece P2 is curved, and thus, the rigidity of the paper which is so-called paper stiffness is increased.

The rigidity of the paper piece P2 is increased, and thus, it is difficult for the paper piece P2 to hang to the lower side when the paper piece P2 passes over the distal end 14*a* of the projection 14. As described above, the paper piece P2 can be more reliably supported by the paper guide 10 due to the projection 14, and the falling can be further suppressed.

Note that, the paper guide 10 may include a plurality of projections 14 in the left-right direction. The paper piece P2 can be more reliably supported by the paper guide 10. In this case, the plurality of projections 14 of the paper guide 10 may be disposed to be bilaterally symmetrical. The paper piece P2 can be supported by the paper guide 10 in a well-balanced manner.

Figure 7:
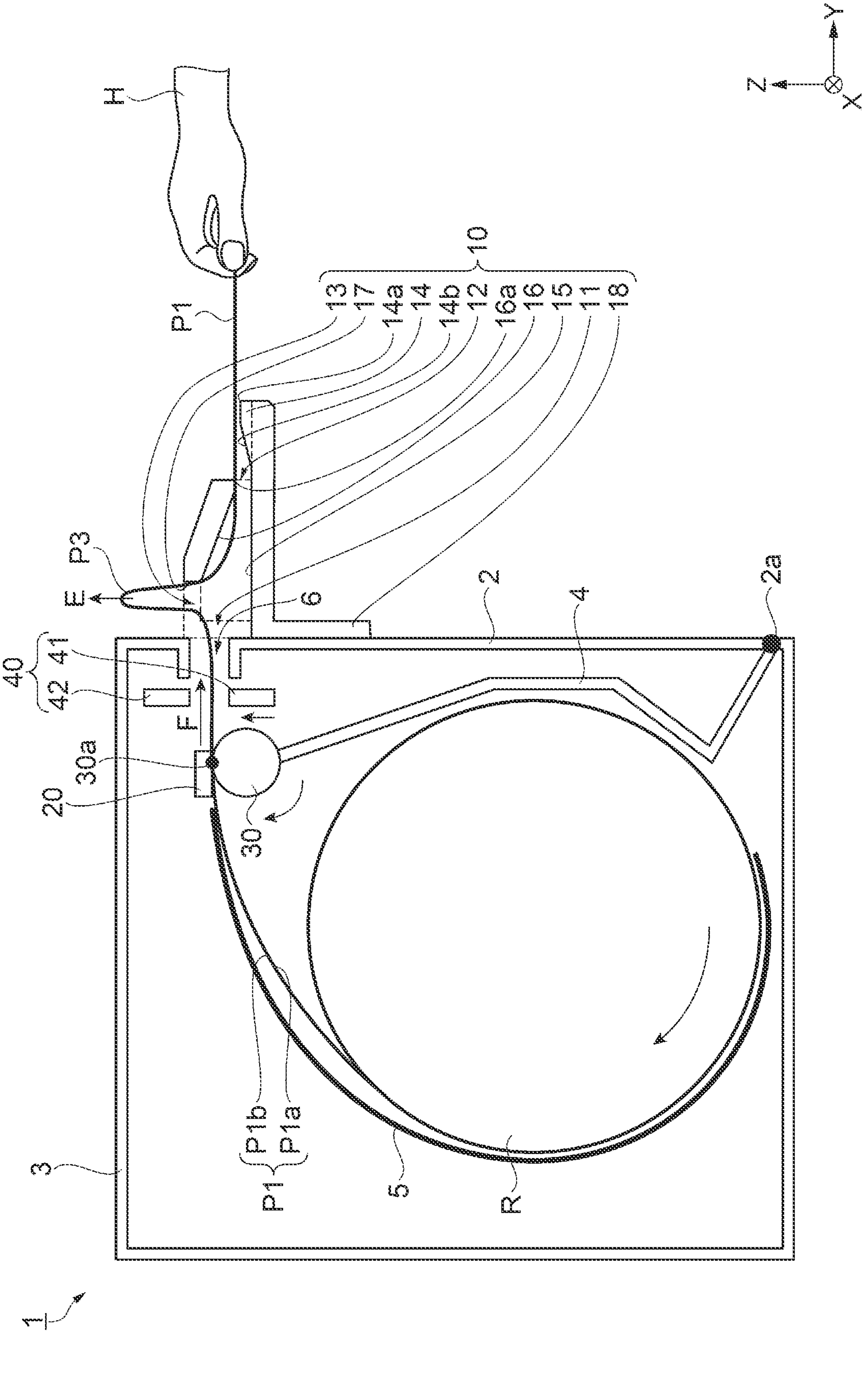
FIG. 7 is a cross-sectional view showing a configuration of the rolled paper printing device for releasing the paper from the paper guide when the paper is pressed.

Incidentally, as shown in FIG. 7, when the paper P1 is transported, via the second opening 12, in the transport direction F from the first opening 11 of the paper guide 10 by the roller 30, the paper P1 taken out from the second opening 12 may be pressed or gripped by a hand H of the user.

In this case, the paper P1 in the paper guide 10 cannot be taken out from the second opening 12, while the paper P1 to be continuously transported enters from the first opening 11. As a result, there is a concern that the paper P1 may be jammed in the paper guide 10.

The paper guide 10 has the third opening 13 that communicates with the front upper side of the first opening 11. When the paper P1 cannot be taken out from the second opening 12 due to being pressed by the hand H of the user or the like, the paper P1 can be taken out in a direction E which is a direction different from the second opening 12 by the third opening 13.

That is, the paper P1 newly entering from the first opening 11 can be taken out from the third opening 13 in the direction E different from the transport direction F.

In FIG. 7, the paper P1 taken out from the third opening 13 is shown as paper P3. The third opening 13 is an opening for releasing the paper P3 from the paper guide 10, and the direction E is a direction for releasing the paper P3 from the paper guide 10.

The paper P1 entering from the first opening 11 is curled to the direction E that is the upper side. Accordingly, when the paper P1 cannot be taken out from the second opening 12, the paper P1 can be easily taken out from the third opening 13 while swelling in the direction E which is a direction in which the paper is curled.

As described above, the third opening 13 can suppress the jamming of the paper P1 entering from the first opening 11 in the paper guide 10. In addition, the user can easily draw out the paper P1 remaining in the paper guide 10 by taking out the paper P3 from the third opening 13.

According to the printing device 1 according to the above-described embodiment, the paper guide 10 includes the first guide 15 that guides the first surface P1*a* of the paper P1 from the lower side and the second guide 16 that guides the second surface P1*b* of the paper P1 from the upper side. Further, the paper guide 10 has the first opening 11 into which the paper P1 discharged from the paper discharge port 6 is inserted, the second opening 12 which communicates with the first opening 11 and from which the paper P1 is taken out, and the projection 14 formed at the first guide 15 at the position downstream of the second opening 12 in the transport direction F and capable of coming into contact with the first surface P1*a* of the paper P1 from the lower side.

As a result, at least the end portion 16*a* of the second guide 16 and the distal end 14*a* of the projection 14 can support the paper piece P2, and the falling of the paper piece P2 from the paper guide 10 can be suppressed by the frictional forces generated between the end portion 16*a* and the distal end 14*a*, and the paper piece P2.

In addition, the first guide 15 can also come into contact with and support the paper piece P2, and the falling of the paper piece P2 from the paper guide 10 can be further suppressed by the frictional force generated between the first guide 15 and the paper piece P2.

Although the embodiment has been described in detail with reference to the drawings, specific configurations are not limited to the embodiment, and modifications, substitutions, deletions, and the like may be made without departing from the gist of the present disclosure.

Although it has been described that the head 20 is an example of the thermal head, the printing method is not particularly limited. For example, the head 20 may be an ink jet head. In this case, since the ink jet head cannot come into contact with the roller 30 to nip the paper P1, a driven roller that faces the roller 30 to nip the paper P1 may be mounted on the case 3. In this case, the paper P1 may be a plain paper or the like.

In the above description, although it has been described that the roller 30 and the first blade 41 constituting the cutter 40 are mounted on the cover 2 and the head 20 and the second blade 42 are mounted on the case 3, the roller 30 and the first blade 41 may be mounted on the case 3 and the head 20 and the second blade 42 may be mounted on the cover 3. In this case, the paper P1 is wound around the rolled paper R such that the outer side becomes the transported surface.

In addition, the paper P1 may be a label paper in which labels are attached to a mount at predetermined intervals.

What is claimed is:

1. A rolled paper printing device comprising:

a cover that opens/closes a case;

a roller that draws out paper from rolled paper stored in the case, and transports the paper in a transport direction;

a head that performs printing on the paper at a position facing the roller;

a cutter that cuts the paper at a position downstream of the head in the transport direction; and a paper guide mounted on the cover, wherein when the cover is closed, a paper discharge port for discharging the paper is formed between the cover and the case, and the paper guide includes a first guide that guides a first surface of the paper, a second guide that guides a second surface of the paper, a first opening into which the paper discharged from the paper discharge port is inserted, a second opening communicating with the first opening, the paper being taken out from the second opening, and a projection formed at the first guide and configured to come into contact with the first surface of the paper at a position downstream of the second opening in the transport direction, wherein the second guide has an end portion forming the second opening, the projection has a distal end and an inclined surface, and when the paper is transported in the transport direction by the roller, the paper comes into contact with the end portion, rides on the inclined surface, and comes into contact with the distal end to be curved.

2. The rolled paper printing device according to claim 1, wherein the paper cut by the cutter is supported by at least the end portion of the second guide and the distal end of the projection.

3. The rolled paper printing device according to claim 1, wherein the head and the roller nip the paper at a nip position, and the end portion of the second guide is at a position lower than the nip position by a first distance, the distal end of the projection is at a position lower than the nip position by a second distance, and the first distance is smaller than the second distance.

4. The rolled paper printing device according to claim 1, wherein the paper guide includes a third opening communicating with the first opening and configured such that the paper is taken out from the third opening in a direction different from the second opening.

5. The rolled paper printing device according to claim 1, wherein the second guide has an end portion forming the second opening, the projection has a distal end and an inclined surface, and when the paper is transported in the transport direction by the roller, the paper comes into contact with the end portion, rides on the inclined surface, and comes into contact with the distal end to be curved.

6. A rolled paper printing device comprising:

a cover that opens/closes a case;

a roller that draws out paper from rolled paper stored in the case, and transports the paper in a transport direction;

a head that performs printing on the paper at a position facing the roller;

a cutter that cuts the paper at a position downstream of the head in the transport direction; and a paper guide mounted on the cover, wherein when the cover is closed, a paper discharge port for discharging the paper is formed between the cover and the case, and the paper guide includes a first guide that guides a bottom surface of the paper, a second guide that guides a top surface of the paper, wherein the second guide is above the first guide, a first opening into which the paper discharged from the paper discharge port is inserted, a second opening communicating with the first opening, the paper being taken out from the second opening, and a projection formed at the first guide and configured to come into contact with the first surface of the paper at a position downstream of the second opening in the transport direction.

* * * * *